US011972735B2

(12) United States Patent
Kim

(10) Patent No.: US 11,972,735 B2
(45) Date of Patent: Apr. 30, 2024

(54) DISPLAY DEVICE

(71) Applicant: LG Display Co., Ltd., Seoul (KR)

(72) Inventor: Jaehyoung Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/994,674

(22) Filed: Nov. 28, 2022

(65) Prior Publication Data

US 2023/0206854 A1 Jun. 29, 2023

(30) Foreign Application Priority Data

Dec. 23, 2021 (KR) ........................ 10-2021-0186162

(51) Int. Cl.
*G09G 3/3266* (2016.01)
*G09G 3/3233* (2016.01)
*G09G 3/3291* (2016.01)

(52) U.S. Cl.
CPC ......... *G09G 3/3266* (2013.01); *G09G 3/3233* (2013.01); *G09G 3/3291* (2013.01); *G09G 2300/0842* (2013.01); *G09G 2310/08* (2013.01); *G09G 2320/0233* (2013.01); *G09G 2340/0435* (2013.01)

(58) Field of Classification Search
None
See application file for complete search history.

(56) References Cited

U.S. PATENT DOCUMENTS

2020/0226978 A1* 7/2020 Lin ...................... G09G 3/3233
2021/0201798 A1* 7/2021 Kim ...................... G09G 3/3233
2021/0366397 A1* 11/2021 Na ...................... G09G 3/3258
2021/0383752 A1* 12/2021 Yang ...................... G09G 3/3233
2022/0059030 A1* 2/2022 Sang ...................... G09G 3/3233

* cited by examiner

*Primary Examiner* — Dorothy Harris
(74) *Attorney, Agent, or Firm* — Fenwick & West LLP

(57) ABSTRACT

A display device comprises: a display panel including a scan line, a power supply line, and a pixel; a gate driver that supplies a scan signal to the pixel; and a bias driver that supplies a bias voltage to the pixel, wherein a driving period of the pixel includes a first and second frame that are different, wherein the first frame includes a first refresh period in which a first data voltage is written and a first reset period in which the first data voltage is maintained, wherein the second frame includes a second refresh period in which a second data voltage is written and a second reset period in which the second data voltage is maintained, and a first voltage pulse of the bias voltage during the first refresh period and a second voltage pulse of the bias voltage during the second refresh period are different.

19 Claims, 11 Drawing Sheets

DISPLAY DEVICE

CROSS REFERENCE TO RELATED APPLICATION

This application claims priority from Republic of Korea Patent Application No. 10-2021-0186162, filed on Dec. 23, 2021, which is hereby incorporated by reference in its entirety.

TECHNICAL FIELD

Embodiments of the present disclosure relate to a display device, more particularly, to a display device capable of improving a display abnormality by applying different driving timings to a pixel circuit.

BACKGROUND

A display device implementing a variety of information on a screen is an important technology in the information and communication era, and has been developing in the direction of thinner, lighter, and more portable and high-performance. Accordingly, a display device capable of being manufactured in a lightweight and thin form has been in the spotlight. A display device using a self-luminous element is not only advantageous in terms of power consumption due to low voltage driving, but also has an excellent high-speed response speed, a high luminous efficiency, a large viewing angle, and a high contrast ratio, and is being studied as a next-generation display device. The display device implements an image through a plurality of sub-pixels that are arranged in a matrix form. Each of the plurality of sub-pixels includes a light emitting device and a pixel circuit such as a plurality of transistors independently driving the light emitting device.

Specific examples of such a display device (for example, a flat panel display) may include a liquid crystal display (LCD), a quantum dot display (QD), a field emission display apparatus (FED), an organic light emitting diode (OLED) display, etc. The organic light emitting diode (OLED) display, which does not require a separate light source and is spotlighted as a means for a compact device and vivid color display, uses an organic light emitting diode (OLED) for emitting light by itself, and has advantages of a fast response speed, a high contrast ratio, a high luminous efficiency, a high luminance, and a large viewing angle.

An organic light emitting diode display device including an organic light emitting diode has various advantages since the device displays an image based on light generated from a light emitting device in a pixel. However, an image abnormality may occur when a short circuit occurs between signal lines within a pixel during the driving thereof.

Accordingly, various driving techniques have been developed to solve image abnormalities, and in order to improve image quality, it is necessary to improve operating performance by controlling driving conditions of pixels.

SUMMARY

An object of embodiments of the present disclosure is to provide a display device capable of preventing the defects such as short circuits caused by potential differences between signal lines by applying different driving timings to a pixel circuit.

In one embodiment, a display device comprises: a display panel including a display area, a non-display area, a scan line, a power supply line, and a pixel in the display area that is connected to the scan line and the power supply line; a gate driver configured to supply a scan signal to the pixel through the scan line; and a bias driver configured to supply a bias voltage to the pixel through the power supply line, wherein a driving period of the pixel includes a first frame and a second frame different from the first frame, wherein the first frame includes a first refresh period in which a first data voltage is written and a first reset period in which the first data voltage is maintained, wherein the second frame includes a second refresh period in which a second data voltage is written and a second reset period in which the second data voltage is maintained, and wherein a first voltage pulse of the bias voltage during the first refresh period and a second voltage pulse of the bias voltage during the second refresh period are different from each other.

In one embodiment, a display device comprises: a display panel including a plurality of pixels configured to display an image at one of a plurality of different refresh frequencies, the plurality of different refresh frequencies including a first refresh frequency and a second refresh frequency that is different from the first refresh frequency; a data driver configured to apply data voltages to the plurality of pixels; and a gate driver configured to apply scan signals to the plurality of pixels, wherein at least one of the plurality of pixels includes: a driving element including a gate electrode of the driving element that is connected to a first node, a first electrode of the driving element that is connected to a second node to which a data voltage from the plurality of data voltages is applied, and a second electrode of the driving element that is connected to a third node; a light emitting element configured to emit light by being driven by a current from the driving element; and a first switch element configured to supply a bias voltage from a power line to the third node that is connected to the second electrode of the driving element while the light emitting element does not emit light, wherein a frequency at which the bias voltage is supplied to the third node during the first refresh frequency is a same as a frequency at which the bias voltage is supplied to the third node during the second refresh frequency.

In one embodiment, a display panel comprises: a light emitting device; a driving transistor configured to drive the light emitting device; a bias transistor configured to control a connection between a drain electrode or a source electrode of the driving transistor and a power supply line; and a data supply transistor configured to control a connection between the source electrode or the drain electrode of the driving transistor and a data line according to a scan signal supplied from a scan line, wherein in a non-display area located outside a display area in which an image is displayed, the scan line and the power supply line are disposed adjacent to each other.

In addition to the technical problems of the present disclosure mentioned above, other features and advantages of the present disclosure may be described below, or will be clearly understood by those skilled in the art from such description.

According to embodiments of the present disclosure, it is possible to improve the display abnormality by preventing a short circuit between two signal lines.

Effects according to the present disclosure are not limited to the contents exemplified above, and more various effects may be included in the present disclosure.

DETAILED DESCRIPTION

Figure 1:
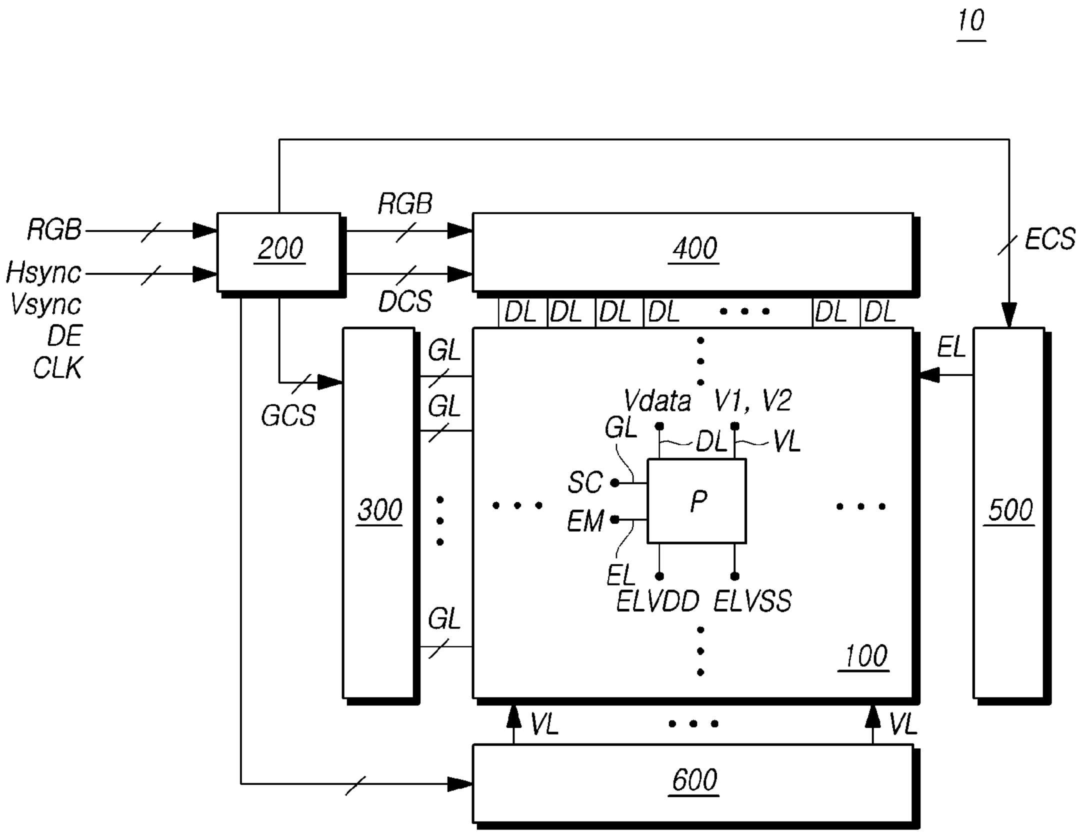
FIG. 1 is a block diagram of a display device according to an embodiment of the present disclosure.

The advantages and features of the present disclosure and a method therefor will become apparent with reference to the embodiments described below in detail in conjunction with the accompanying drawings. However, the present disclosure is not limited to the embodiments disclosed below, but will be implemented in various different forms. The present embodiments are provided to only explain the disclosure of the present specification is complete, and to completely inform those of ordinary skill in the art of this specification the scope of the invention, and the specification will be defined by the scope of the claims.

The shape, size, ratio, angle, number, etc. disclosed in the drawings for explaining the embodiment in the present specification are exemplary and the embodiment of the present specification is not limited to the illustrated matters. In addition, in describing the embodiment, if it is determined that a detailed description of a related known technology may unnecessarily obscure the gist of the embodiment, the detailed description thereof will be omitted.

In the case that the terms of 'include', 'have', 'comprise' etc. are used in this specification, it should be understood as being able to add other parts or elements unless 'only' is used. When an element is expressed in the singular, there may be understood to include cases including the plural unless otherwise explicitly stated.

In addition, in interpreting the elements, it should be interpreted as including an error range even if there is no separate explicit description.

In the description related to spatial relationship, for example, when the positional relationship of two element is described using the terms of "on", "upper", "above", "below", "under", "beneath", "lower", "near", "close", "adjacent", it should be interpreted that one or more elements may be further "interposed" between the elements unless the terms such as "directly", "only" are used.

In the case of a description of a temporal relationship, for example, when a temporal relationship is described as 'after', 'following', 'next', 'then', 'before', it may include cases that are not continuous unless 'immediately' or 'directly' is used.

When the terms, such as "first", "second", or the like, are used herein to describe various elements or components, it should be considered that these elements or components are not limited thereto. These terms are merely used herein for distinguishing an element from other elements. Therefore, a first element mentioned below may be a second element in a technical concept of the present disclosure.

The term "at least one" should be understood to include all possible combinations of one or more related elements. For example, the meaning of "at least one of the first, second, and third elements" may mean all combinations of two or more elements of the first, second and third elements as well as each of the first, second and third element.

The features of each of the embodiments of the present specification may be partially or wholly combined or coupled with each other, and may be various technically linked or operated. In addition, each of the embodiments may be implemented independently of each other or may be implemented together in a related relationship.

Hereinafter, it will be described embodiments of a display device according to the present disclosure with reference to the drawings. In adding reference numerals to components of each drawing, the same components may have the same reference numerals as much as possible even though they are indicated on different drawings. In addition, since the scales of the components shown in the accompanying drawings may have different scales from the actual for convenience of description, the scales shown in the drawings are not limited thereto.

Hereinafter, it will be described embodiments of the present disclosure in detail with reference to the accompanying drawings.

FIG. 1 is a block diagram of a display device according to an embodiment of the present disclosure.

Referring to FIG. 1, a display device 10 may include a display panel 100 including a plurality of pixels P, a controller 200, a gate driver 300 supplying a gate signal to each of the plurality of pixels P, a data driver 400 supplying a data signal to each of the plurality of pixels P, a light emission signal generator 500 for supplying the emission signal to each of the plurality of pixels P, and a bias driver 600.

The controller 200 may process the image data RGB input from the outside the display device 10 according to a size and resolution of the display panel 100 and supply the processed image data to the data driver 400. The controller 200 may use synchronization signals SYNC input from the outside, for example, a dot clock signal CLK, a data enable signal DE, a horizontal synchronization signal Hsync, and a vertical synchronization signal Vsyn to generate a plurality of gate control signal GCS, data control signals DCS, and emission control signals ECS. The plurality of gate control signal GCS, data control signals DCS, and emission control signals ECS generated may be supplied to the gate driver 300, the data driver 400 and the light emission signal generator 500 to control the gate driver 300, the data driver 400 and the light emission signal generator 500, respectively.

The controller 200 may be configured in combination with various processors, for example, a microprocessor, a mobile processor, an application processor, etc. depending on the device to which the controller is mounted.

The controller 200 may generate signals so that the plurality of pixels P can be driven at various refresh rates. That is, the controller 200 may generate driving-related signals so that each pixel may be driven in a variable refresh rate (VRR) mode or switchable between a first refresh rate and a second refresh rate. For example, the controller 200 may simply change a speed of the clock signal, generate a synchronization signal to generate a horizontal blank or a vertical blank, or drive the gate driver 300 in a mask method so as to drive the plurality of pixels P at various refresh rates.

Each of the plurality of pixels P may be driven through a combination of a refresh frame and a reset frame according to a refresh rate within one frame. Thus, one frame in which an image is displayed includes a refresh frame period (e.g., a display period) and a reset frame period (e.g., horizontal blank or vertical blank).

For example, if the refresh rate is driven at 120 Hz, the pixels P may be driven with the refresh frame without the reset frame, and if the refresh rate is driven at 10 Hz (or 60 Hz), the refresh frame and the reset frame may be driven alternately. In particular, for example, if the refresh rate is driven at 1 Hz, within one frame, one refresh frame and a plurality of reset frames may be configured as one set and may be driven to be repeated.

In addition, the controller 200 may generate various signals for driving the pixel at a first refresh rate, and in particular, when the pixel is driven at the first refresh rate, the controller 200 may generate an emission control signal ECS for the light emission signal generator 500 to generate an emission signal EM(n) having a first duty ratio. Thereafter, the controller 200 may operate to drive the pixel at a second refresh rate, and may generate various signals for driving the pixel at the second refresh rate. In particular, when the pixel is driven at the second refresh rate, the controller may generate the emission control signal ECS so that the light emission signal generator 500 generates an emission signal EM(n) having a second duty ratio different from the first duty ratio.

The gate driver 300 may supply the scan signal SC to a gate line GL according to the gate control signal GCS supplied from the controller 200. Although FIG. 1 illustrates that the gate driver 300 is spaced apart from one side of the display panel 100, the number and arrangement position of the gate driver 300 are not limited thereto. That is, the gate driver 300 may be disposed on one side or both sides of the display panel 100 in a gate-in-panel (GIP) method.

The data driver 400 converts the image data RGB into a data voltage Vdata according to the data control signal DCS supplied from the controller 200, and supplies the converted data voltage Vdata to the pixel through a data line DL.

In the display panel 100, a plurality of gate lines GL, a plurality of emission lines EL, and a plurality of data lines DL may cross each other, and each of the plurality of pixels may be connected to the gate line GL, the emission line EL and the data line DL. Specifically, one pixel receives the gate signal from the gate driver 300 through the gate line GL, receives the data signal from the data driver 400 through the data line DL, receives the emission signal EM(n) through the emission line EL, and receives various power sources through a power supply line. Here, the gate line GL supplies the scan signal SC, the emission line EL supplies the emission signal EM(n), and the data line DL supplies the data voltage Vdata. However, according to various embodiments, the gate line GL may include a plurality of scan signal lines, and the display panel 100 may additionally include a plurality of power supply lines VL. Also, the emission line EL may include a plurality of emission signal lines. In addition, one pixel receives a high potential voltage or a first power voltage ELVDD and a low potential voltage or a second power voltage ELVSS. In addition, first and second bias voltages V1 and V2 may be supplied through one or more power supply lines VL. The first bias voltage V1 may be supplied from the bias driver 600.

In addition, each pixel includes a light emitting device ELD and a pixel circuit for controlling driving of the light emitting device ELD. Here, the light emitting device ELD includes an anode, a cathode, and an organic light emitting layer between the anode and the cathode. The pixel circuit includes a plurality of switching devices, a driving switching device, and a capacitor. Here, the switching device may be constituted by a TFT, and in the pixel circuit, a driving TFT controls the amount of current supplied to the light emitting device ELD according to the difference between the data voltage charged in the capacitor and a reference voltage, thereby the amount of light emitted by the light emitting device ELD may be adjusted. In addition, a plurality of switching TFTs receive the scan signal SC(n) supplied through the gate line GL and the emission signal EM(n) supplied through the emission line EL to charge the data voltage Vdata to the capacitor.

Figure 2A:
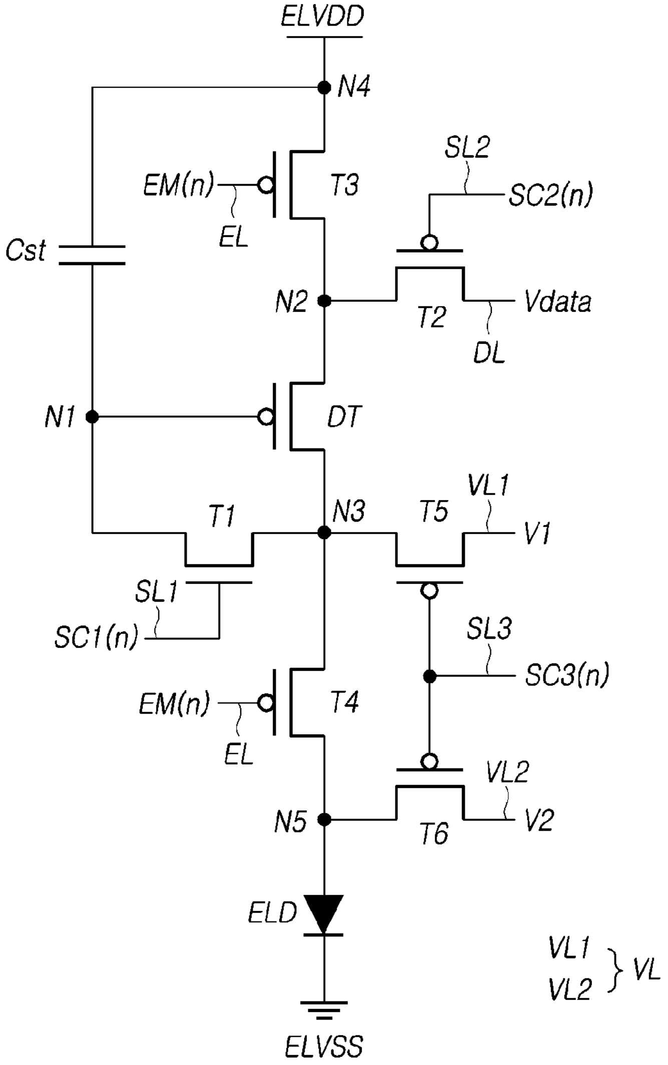
FIGS. 2A to 2C are exemplary circuit diagrams of a pixel circuit in a display device according to an embodiment of the present disclosure.
Figure 2B:
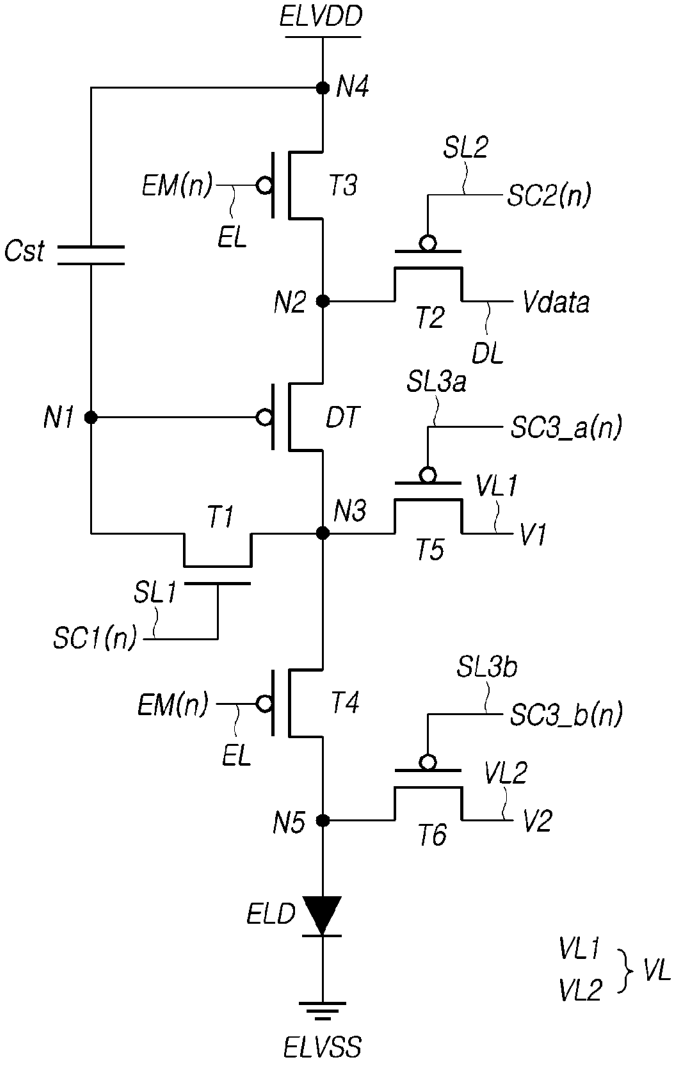
Figure 2C:
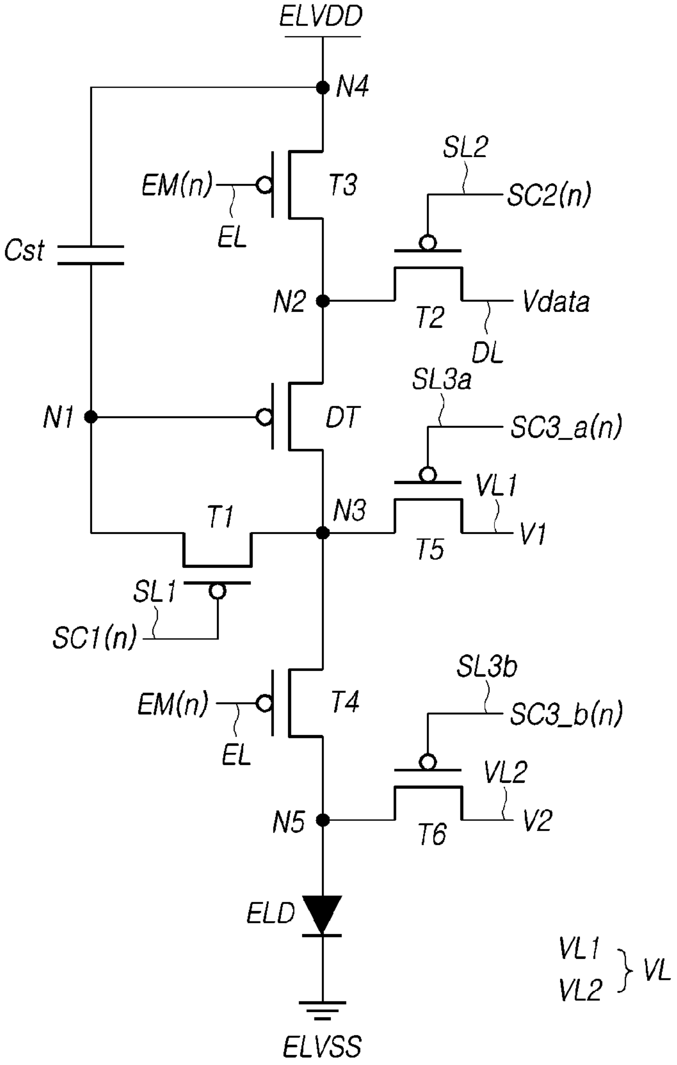

FIGS. 2A to 2C are exemplary circuit diagrams of a pixel circuit in a display device according to an embodiment of the present disclosure.

FIGS. 2A to 2C exemplify a pixel circuit for explanation purposes, and is not limited thereto, as long as it has a structure capable of controlling light emission of the light emitting device ELD by applying the emission signal EM(n). For example, the pixel circuit may include an additional scan signal, a switching TFT connected thereto, and a switching TFT to which an additional initialization voltage is applied, and a connection relationship between switching devices or a connection position of a capacitor may be variously disposed. That is, if the light emission of the light emitting device ELD is controlled according to a change in the duty ratio of the emission signal EM(n) and the light emission can be controlled according to the refresh rate, pixel circuits having various structures may be used. For example, various pixel circuits such as 3T1C, 4T1C, 6T1C, 7T1C, and 7T2C may be used. Hereinafter, it will be described a display device including the pixel circuit of 7T1C of FIGS. 2A to 2C for convenience of description.

Referring to FIG. 2A, each of the plurality of pixels P may include a pixel circuit including a driving transistor DT and a light emitting device ELD connected to the pixel circuit.

The pixel circuit may drive the light emitting device ELD by controlling a driving current Id flowing through the light emitting device ELD. The pixel circuit may include the driving transistor DT, first to sixth transistors T1 to T6, and a storage capacitor Cst. Each of the transistors DT and T1 to T6 may include a first electrode, a second electrode, and a gate electrode. One of the first and second electrodes may be a source electrode, and the other of the first and second electrodes may be a drain electrode.

Each of the transistors DT and T1 to T6 may be a PMOS transistor or an NMOS transistor. In the embodiment of FIGS. 2A and 2B, the first transistor T1 is a NMOS transistor, and the remaining transistors DT and T2 to T6 are PMOS transistors. In addition, in the embodiment of FIG. 2C, the first transistor T1 is configured as a PMOS transistor rather than a NMOS transistor.

Hereinafter, it will be exemplarily described a case in which the first transistor T1 is an NMOS transistor, and the remaining transistors DT, T2 to T6 are PMOS transistors. Accordingly, the first transistor T1 is turned on by being applied a logic high voltage, and the other transistors DT, T2 to T6 are turned on by being applied a logic low voltage.

According to an example, the first transistor T1 constituting the pixel circuit may serve as a compensation transistor, the second transistor T2 may serve as a data supply transistor, the third and fourth transistors T3 and T4 may serve as light emission control transistors, and the fifth and sixth transistors T5 and T6 may serve as bias transistors.

The light emitting device ELD may include a pixel electrode (or an anode electrode) and a cathode electrode. The pixel electrode of the light emitting device ELD may be connected to a fifth node N5, and the cathode electrode may be connected to a second power voltage ELVSS.

The driving transistor DT may include a first electrode connected to a second node N2, a second electrode connected to a third node N3, and a gate electrode connected to a first node N1. The driving transistor DT may provide a driving current Id to the light emitting device ELD based on the voltage of the first node N1 (or a data voltage stored in the capacitor Cst to be described later).

The first transistor T1 may include a first electrode connected to the first node N1, a second electrode connected to the third node N3, and a gate electrode receiving a first scan signal SC1(*n*) through a first scan line SL1. The scan signal SC1(*n*) may change between a first level and a second level where the first level is greater than the second level. The first transistor T1 may be turned on in response to the first scan signal SC1(*n*), and may transmit the data signal Vdata to the first node N1. The first transistor T1 may be diode-connected between the first node N1 and the third node N3 to sample a threshold voltage Vth of the driving transistor DT. The first transistor T1 may be a compensation transistor.

The capacitor Cst may be connected or formed between the first node N1 and a fourth node N4. The capacitor Cst may store or maintain the data signal Vdata provided.

The second transistor T2 has a first electrode connected to the data line DL (or receiving the data signal Vdata), a second electrode connected to the second node N2, and a gate electrode receiving a second scan signal SC2(*n*) through the second scan line SL2. The second transistor T2 may be turned on in response to the second scan signal SC2(*n*) through a second scan line SL2, and may transmit the data signal Vdata to the second node N2. The second transistor T2 may be a data supply transistor.

The third transistor T3 and the fourth transistor T4 (or the first and second light emission control transistors) may be connected between the first power voltage ELVDD and the light emitting device ELD, and may form a current movement path through which the driving current Id generated by the driving transistor DT flows.

The third transistor T3 may include a first electrode connected to the fourth node N4 to receive the first power voltage ELVDD, a second electrode connected to the second node N2, and a gate electrode for receiving the emission signal EM(n) through an emission line EL.

Similarly, the fourth transistor T4 may include a first electrode connected to the third node N3, a second electrode connected to the fourth node N5 (or a pixel electrode of the light emitting device ELD), and a gate electrode receiving the emission signal EM(n) through the emission line EL.

The third and fourth transistors T3 and T4 may be turned on in response to the emission signal EM(n), and in this case, the driving current Id is provided to the light emitting device ELD, and the light emitting device ELD may emit light with a luminance corresponding to the driving current Id.

The fifth transistor T5 may include a first electrode connected to the third node N3, a second electrode receiving the first bias voltage V1 through a first power supply line VL1, and a gate electrode receiving a third scan signal SC3(*n*) through a third scan line SL3. Here, the power supply line VL may include the first power supply line VL1 and a second power supply line VL2.

The sixth transistor T6 may include a first electrode connected to a fifth node N5, a second electrode receiving the second bias voltage V2 through the second power supply line VL2, and a gate electrode receiving the third scan signal SC3(*n*) through the third scan line SL3. In FIG. 2A, the gate electrodes of the fifth and sixth transistors T5 and T6 are configured to receive the third scan signal SC3(*n*) through the third scan line SL3 in common. However, the present disclosure is not limited thereto, and as shown in FIGS. 2B and 2C, the gate electrodes of the fifth and sixth transistors T5 and T6 may be configured to receive separate third scan signals SC3_*a*(*n*) and SC3_*b*(*n*) through separate third scan lines SL3*a* and SL3*b* to be independently controlled.

The sixth transistor T6 may be turned on in response to the third scan signal SC3(*n*) before the light emitting device ELD emits light (or after the light emitting device ELD emits light), and may initialize the pixel electrode (or the anode electrode) of the light emitting device ELD by using the second bias voltage V2. The light emitting device ELD may have a parasitic capacitor formed between the pixel electrode and the cathode electrode. In addition, the parasitic capacitor is charged while the light emitting device ELD emits light, so that the pixel electrode of the light emitting device ELD may have a specific voltage. Accordingly, by applying the second bias voltage V2 to the pixel electrode of the light emitting device ELD through the sixth transistor T6, the amount of charge accumulated in the light emitting device ELD may be initialized.

Figure 3A:
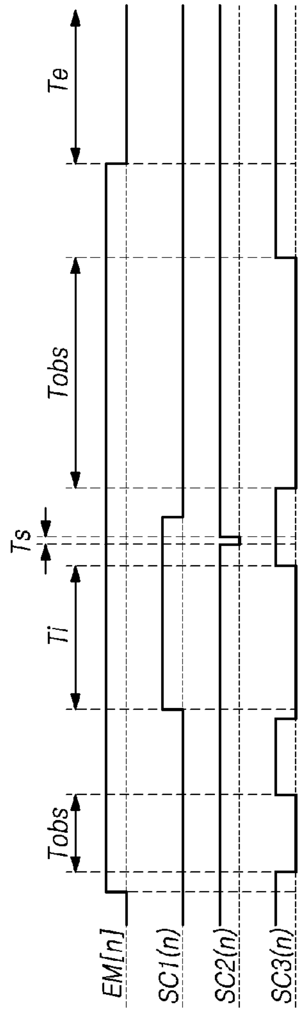
FIGS. 3A and 3B are diagrams for explaining driving of a pixel circuit in a display device shown in FIGS. 2A to 2C according to an embodiment of the present disclosure.
Figure 3B:
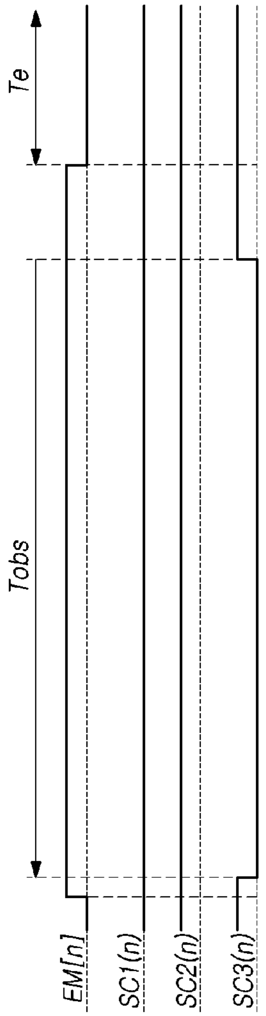

FIGS. 3A and 3B are diagrams for explaining driving of the pixel circuit in the display device shown in FIGS. 2A to 2C. according to one embodiment Referring to FIGS. 3A and 3B, each of the plurality of pixels P may initialize a voltage charged or remaining in the pixel circuit. Specifically, the influence of the data voltage Vdata and the driving voltage VDD stored in the previous frame may be removed. Accordingly, each of the plurality of pixels P may display an image corresponding to the new data voltage Vdata.

The operation of the pixel circuit may be performed by including at least one initialization period, a sampling period, and an emission period, but this is an example and is not necessarily limited to this order.

The display device according to an embodiment of the present disclosure may be driven by dividing a frame into a refresh frame and a reset frame. In the refresh frame, the data voltage Vdata may be programmed in each pixel P, and the light emitting device ELD may emit light. In addition, the reset frame may be a vertical blank frame, and the anode electrode of the light emitting device ELD is reset during the reset frame. In the present disclosure, “frame”, “refresh frame” and “reset frame” may be a concept of a time period, and in some cases, may have the meaning of an image or a driving mode.

In the display device according to the embodiment of the present disclosure, the refresh frame may be divided into an on-bias stress period Tobs (hereinafter referred to as a “stress period”), an initial period Ti, a sampling period Ts and an emission period Te. The stress period Tobs is a period in which a bias stress is applied to the first node N1 which is the gate electrode of the driving transistor DT. The initial period Ti is a period for initializing the voltage of the third node N3 which is the drain electrode of the driving transistor DT. The sampling period Ts is a period for sampling the threshold voltage Vth of the driving transistor DT and programming the data voltage Vdata. The emission period Te is a period in which the light emitting device ELD emits light according to a driving current due to the programmed source-gate voltage of the driving transistor DT.

Specifically, referring to FIG. 3A which shows an example of a refresh frame, during a first stress period Tobs, the third scan signal SC3(*n*), specially, a third scan signal SC3_*a*(*n*) as shown in FIGS. 2B and 2C, is a low level which is a turn-on level. Accordingly, the fifth transistor T5 is turned on to apply the first bias voltage V1 from the power supply lines VL to the third node N3. The first bias voltage V1 may be a stress voltage Vobs or an initialization voltage Vini. The stress voltage Vobs may be selected within a voltage range sufficiently higher than the operating voltage of the light emitting device ELD, and may be set to be equal to or lower than a first driving power ELVDD. That is, a bias stress may be applied to the third node N3 which is the drain electrode of the driving transistor DT during the first stress period Tobs to decrease the gate-source voltage Vgs of the driving transistor DT. Accordingly, a hysteresis effect the driving transistor DT may be reduced by flowing a source-drain current Ids of the driving transistor DT during the first stress period Tobs.

In addition, the sixth transistor T6 is turned on to apply a reset voltage VAR to the fifth node N5. That is, the anode electrode of the light emitting device ELD is reset to the second bias voltage V2. The second bias voltage V2 may be the reset voltage VAR.

Furthermore, referring to FIG. 3A, during the initial period Ti, the first scan signal SC1(*n*) is a high level which is a turn-on level, and the third scan signal SC3(*n*) is a low level which is a turn-on level. Accordingly, the first transistor T1 and the fifth transistor T5 are turned on to apply the initialization voltage Vini to the third node N3 from the power supply lines VL. As a result, the gate electrode of the driving transistor DT is initialized to the initialization voltage Vini. The initialization voltage Vini may be selected within a voltage range sufficiently lower than the operating voltage of the light emitting device ELD, and may be set to be equal to or lower than a second driving power VSSEL. In addition, in the initial period Ti, the sixth transistor T6 is turned on again to apply the reset voltage VAR to the fifth node N5.

In addition, referring to FIG. 3A, during the sampling period Ts, the first scan signal SC1(*n*) is a high level which is a turn-on level, and the second scan signal SC2(*n*) is a low level which is a turn-on level. During the sampling period Ts, the second transistor T2 is turned on, and the data voltage Vdata is applied to the second node N2. In addition, as the first transistor T1 is also turned on, the driving transistor DT is diode-connected, and the gate electrode and the drain electrode of the driving transistor DT are short-circuited, so that the driving transistor DT operates like a diode.

In the sampling period Ts, a current Ids flows between the source and drain of the driving transistor DT. Since the gate electrode and the drain electrode of the driving transistor DT are in a diode-connected state, the voltage of the second node N2 is increased by the current flowing from the source electrode to the drain electrode until the gate-source voltage Vgs of the driving transistor DT is Vth.

Further, referring to FIG. 3A, during the second stress period Tobs, the third scan signal SC3(*n*), specially, a third scan signal SC3_*b*(*n*) as shown in FIGS. 2B and 2C, is a low level which is a turn-on level. Accordingly, the sixth transistor T6 is turned on to apply the reset voltage VAR to the fifth node N5. That is, the anode electrode of the light emitting device ELD is reset to the reset voltage VAR. Also, the fifth transistor T5 is turned on to apply the stress voltage Vobs to the third node N3. That is, the hysteresis effect of the driving transistor DT may be alleviated by applying a bias stress to the third node N3 as the drain electrode of the driving transistor DT during the second stress period Tobs.

In addition, referring to FIG. 3A, during the emission period Te, the emission signal EM(*n*) is a low level which is a turn-on level. Accordingly, the third transistor T3 is turned on to apply the first driving power ELVDD to the first node N1. In addition, since the second node N2 is coupled to the first driving power ELVDD through the storage capacitor Cst, the first driving power ELVDD is also reflected in the second node N2. In addition, the fourth transistor T4 is also turned on to form a current path between the third node N3 and the fourth node N4. As a result, a driving current Ioled passing through the source electrode and the drain electrode of the driving transistor DT is applied to the light emitting device ELD.

In addition, referring to FIG. 3B which is an example of a reset frame, during the reset frame, the first scan signal SC1(*n*) is maintained at a low level which is a turn-off level (for the examples of FIGS. 2A and 2B), and the second scan signal SC2(*n*) is also maintained at a high level which is a turn-off level. Accordingly, the data voltage Vdata is not programmed in each pixel P during the reset frame.

However, the third scan signal SC3(*n*) may swing (alternate) periodically. That is, when the third scan signal SC3(*n*) periodically swings, the reset frame may include a plurality of stress periods Tobs. However, the present disclosure is not limited thereto, and one stress period Tobs may be included in the reset frame as shown in FIG. 3B.

That is, during the reset frame, the anode electrode of the light emitting device ELD is reset to the reset voltage VAR and a bias stress is applied to the third node N3 as the drain electrode of the driving transistor DT.

As a result, in the display device according to the embodiment of the present disclosure, the anode electrode of the light emitting device ELD may be periodically reset over the refresh frame and the reset frame. Accordingly, there may be prevented the continuous increase of the voltage of the anode electrode of the light emitting device ELD due to the leakage current, so that the anode electrode of the light emitting device ELD may maintain a constant voltage level. Accordingly, the change in luminance of the display device may be reduced, and thus image quality may be improved.

Figure 4A:
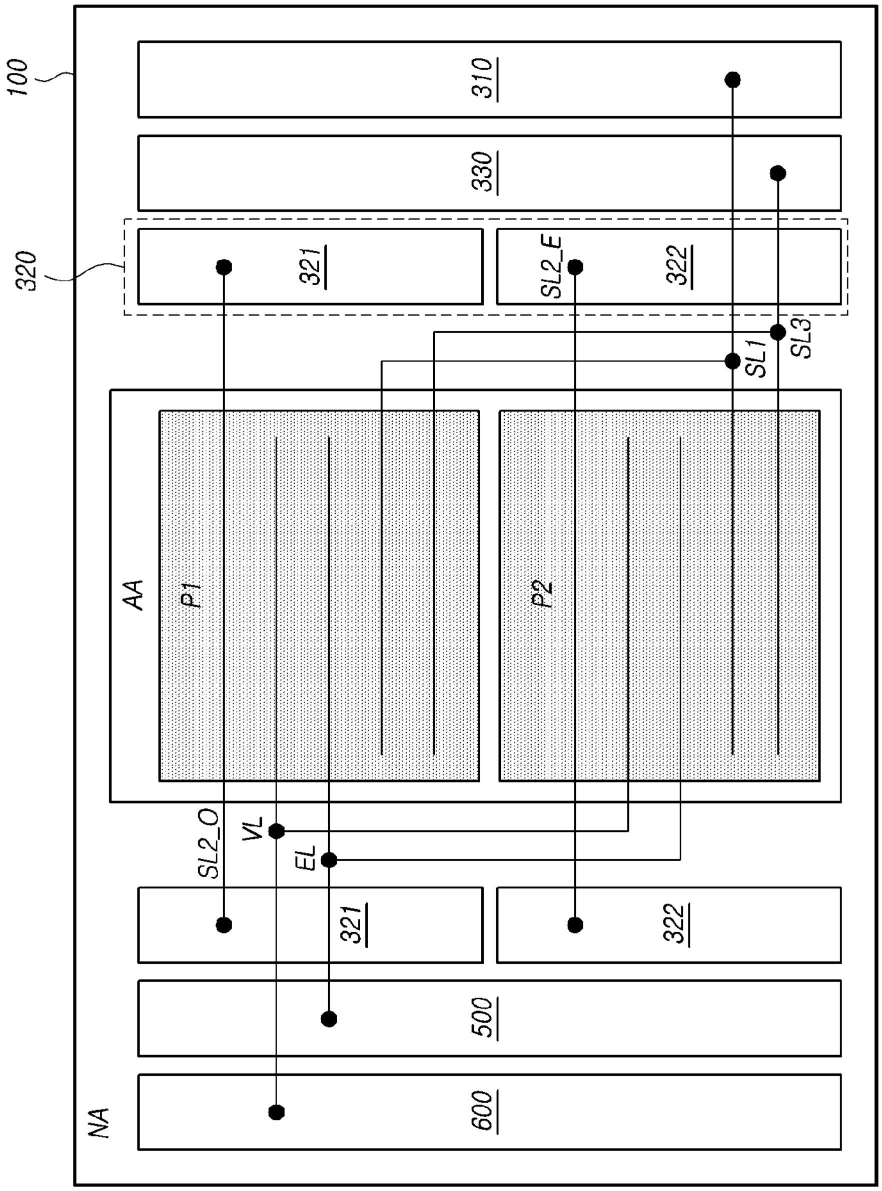
FIGS. 4A and 4B are schematic plan views of a display panel in a display device according to an embodiment of the present disclosure.
Figure 4B:
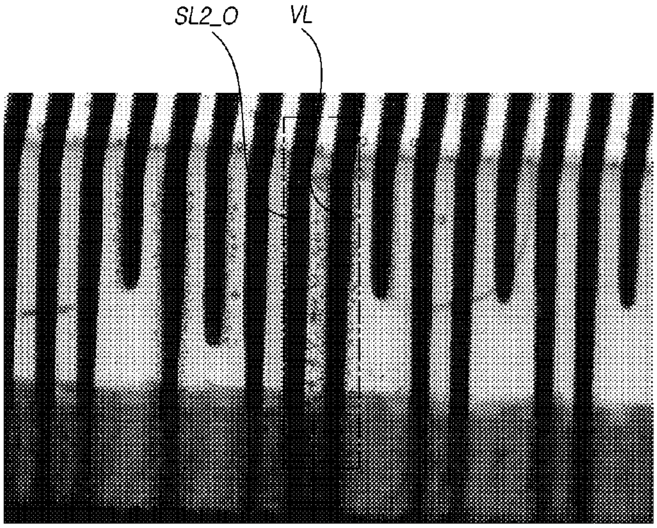

FIGS. 4A and 4B are schematic plan views of a display panel in a display device according to an embodiment of the present disclosure.

Referring to FIG. 4A, a display panel 100 may include a display area (or active area) AA and a non-display area (or non-active area) NA.

The display area AA is an area in which pixels P are arranged to display an image.

The non-display area NA may be disposed around the display area AA. For example, the non-display area NA may be disposed along the edge of the display area AA. The non-display area NA may mean all areas other than the display area AA, and may be a bezel area.

The drivers for driving the pixels P (for example, the pixels P1 and P2 as shown in FIG. 4A) may be provided in the non-display area NA. The drivers may include, for example, the gate driver 300, the light emission signal generator 500 and the bias driver 600.

The pixels P may have the structure of the pixel circuit shown in FIGS. 2A to 2C. Accordingly, the gate driver 300, the light emission signal generator 500 and the bias driver 600 may supply the first to third scan signals SC1(*n*) to SC3(*n*) and the emission signal EM(*n*) to the pixels P.

The gate driver 300 may include a first scan driver 310 for outputting a first scan signal SC1(*n*) to a plurality of first scan lines SL1, a second scan driver 320 for outputting a second scan signal SC2(*n*) to a plurality of second scan lines SL2, and a third scan driver 330 for outputting a third scan signal SC3(*n*) to a plurality of third scan lines SL3. The light emission signal generator 500 may output the emission signals EM(*n*) to a plurality of emission lines EL. Further, the bias driver 600 may output the first bias voltage V1 to a plurality of power supply lines VL.

In the display device according to the embodiment of the present disclosure, at least one of the first to third scan drivers 310, 320 and 330 may be configured to include a first driver outputting an odd scan signal and a second driver outputting an even scan signal. For example, the second scan driver 320 may include a second-1 driver 321 for outputting second odd scan signals SC2_O to a first group of scan lines of the second scan lines SL2 and a second-2 driver 322 for outputting second even scan signals SC2_E to a second group of scan lines of the second scan lines SL2. In this case, the first group of scan lines outputting the second odd scan signals SC2_O may be the second odd scan lines SL2_O, and the second group of scan lines outputting the second even scan signals SC2_E may be the second even scan line SL2_E.

The first to third scan drivers 310, 320 and 330, the light emission signal generator 500 and the bias driver 600 may be integrally formed in the non-display area NA of the display panel 100 according to a gate-in-panel (GIP) method. For example, the first to third scan drivers 310, 320 and 330, the light emission signal generator 500 and the bias driver 600 may be disposed on both the right side (or upper side) and the left side (or lower side) of the display area AA.

In an embodiment, the first scan driver 310 and the third scan driver 330 may be disposed in a right bezel area of the display area AA, that is, the right non-display area NA, and the light emission signal generator 500 and the bias driver 600 may be disposed in a left bezel area of the display area AA, that is, the left non-display area NA. The first scan driver 310 and the third scan driver 330 may be disposed adjacent to each other in a row direction in the right bezel area. The light emission signal generator 500 and the bias driver 600 may be disposed adjacent to each other in the row direction in the left bezel area.

In this embodiment, the first scan driver 310 and the third scan driver 330 may simultaneously apply a signal of the same waveform per two rows for each of the first and third scan lines SL1 and SL3 from one side, that is, the left or right side of the display area AA. In addition, the light emission signal generator 500 and the bias driver 600 may also simultaneously apply the same waveform signal per two rows for each of the emission line EL and the power supply line VL from the left or right side of the display area AA.

In an embodiment, a plurality of second scan drivers 320 are provided in the left and right bezel areas. Each of the second scan drivers 320 may supply the second scan signal SC2(*n*) to the second odd scan line SL2_O and the second even scan line SL2_E. The second-1 driver 321 and the second-2 driver 322 of the second scan driver 320 may be disposed adjacent to each other in a column direction in the bezel area. That is, the second-1 driver 321 and the second-2 driver 322 are aligned in a direction in which the data lines extend in the display panel 100.

In this embodiment, the second scan drivers 320 may be configured to simultaneously apply the second scan signal SC2(*n*) of the same waveform from both sides to one second scan line SL2.

Referring to FIG. 4B, the second odd scan line SL2_O and the power supply line VL may be disposed adjacent to each other.

In an embodiment, if the data driver 400 is manufactured as a driving chip, the data driver 400 may be mounted on a flexible film using a chip-on-film (COF) method. The COF-type flexible film may be attached to the display panel 100, and an area in which the flexible film and the display panel 100 come into contact may be referral to as a film-on-panel (FOP) portion.

When driving in a high-temperature, high-humidity environment, there may occur a display abnormality. That is, since the second odd scan line SL2_O having a higher potential voltage level and the power supply line VL having a lower potential voltage level than the second scan signal SC2 applied to the second odd scan line SL2_O are disposed adjacent to each other, there may occur a defect due to a large potential difference between the second odd scan line SL2_O and the power supply line VL. That is, a dendrite phenomenon may occur from the power supply line VL having a low potential on the FOP portion to the second odd scan line SL2_O having a high potential. In this case, the power supply line VL and the second odd scan line SL2_O may be short-circuited. As the low potential power supply line VL and the high potential second odd scan line SL2_O are short-circuited, an overcurrent flows. In addition, in order to prevent damage from this, the power supply circuit (not shown) may shut down the power supply circuit according to an internal feedback signal. Accordingly, the display panel 100 may not display an image.

Figure 5A:
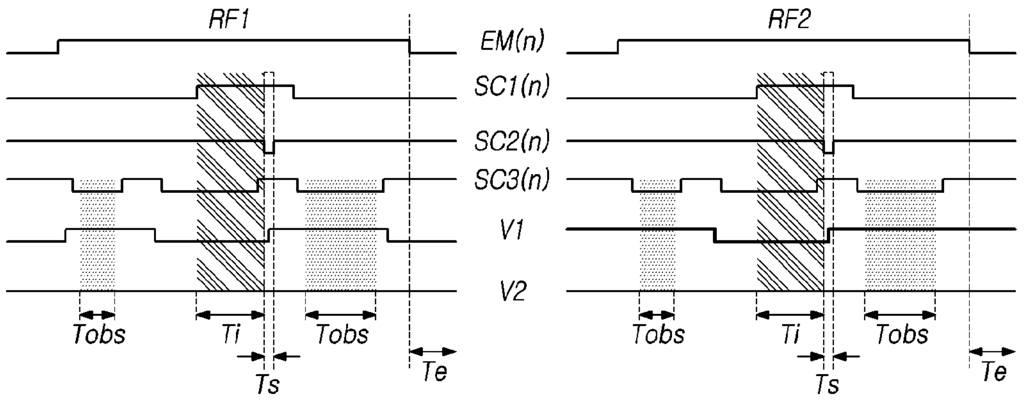
FIGS. 5A and 5B are diagrams for explaining driving of a pixel circuit in a display device according to an embodiment of the present disclosure.
Figure 5B:
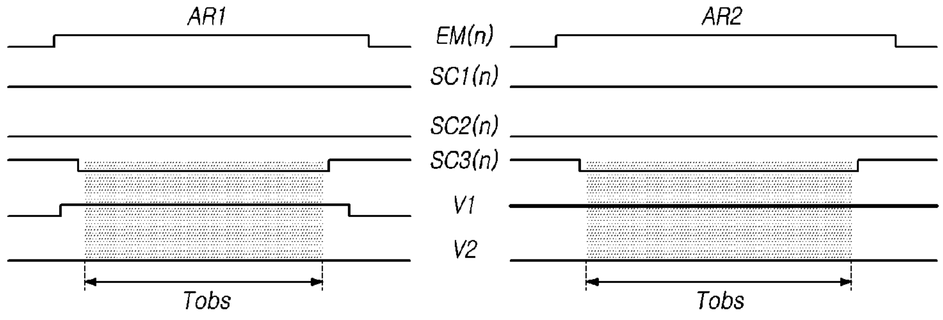

FIGS. 5A and 5B are diagrams for explaining driving of a pixel circuit in a display device according to an embodiment of the present disclosure.

Referring to FIGS. 5A and 5B, in order to prevent a short circuit between the power supply line VL having a low potential and the second odd scan line SL2_O having a high potential, the refresh frame may be configured to include, according to the first bias voltage V1, a plurality of refresh frames such as a first refresh frame RF1 and a second refresh frame RF2 that has a driving timing different from that of the first refresh frame RF1. In addition, similar to the refresh frame, the reset frame may be configured to include a plurality of reset frames including a first reset frame AR1 and a second reset frame AR2 having different driving timings Although it is not shown in the drawings, it should be noted that if necessary, the refresh frame may be configured to include a third or more refresh frame having a driving timing different from that of the first refresh frame RF1 and the second refresh frame RF2, and the reset frame may be configured to include a third or more reset frame having a driving timing different from that of the first reset frame AR1 and the second reset frame AR2.

Referring to FIG. 5A, the first refresh frame RF1 may be driven at a high level (e.g., a first level voltage) such that the first bias voltage V1 with the high level is applied as the stress voltage Vobs during the stress period Tobs, and may be driven at a low level (e.g., a second level voltage) that is less than the high level such that the first bias voltage V1 with the low level is applied as the initialization voltage Vini during the initial period Ti. Also, the first bias voltage V1 applied at the high level during the stress period Tobs may be switched back to the low level after the stress period Tobs is terminated.

When the first bias voltage V1 is driven as a first stress voltage Vobs, the high level may be maintained for, for example, at least 8 horizontal periods (e.g., a first duration), and when the first bias voltage V1 is driven as a second stress voltage Vobs, the high level may be maintained for, for example, at least 16 horizontal periods (e.g., a second duration). In addition, when the first bias voltage V1 is driven as the initialization voltage Vini, the first bias voltage V1 may be maintained at a low level for, for example, at least 20 horizontal periods.

In the second refresh frame RF2, the first bias voltage V1 applied at the high level during the second stress period Tobs may be maintained at the high level without being switched back to the low level. In other words, the first bias voltage V1 may be a high level in all of the remaining periods except for the low level for at least 20 horizontal periods between the stress periods Tobs driven by the first stress voltage Vobs and the second stress voltage Vobs. Thus, the first bias voltage V1 has the low level between the first and second stress periods Tobs during the second refresh frame RF2, but after the second stress period the first bias voltage is at the high-level for a period of time. In other words, a voltage pulse of the first bias voltage V1 during the second stress period of the second refresh frame is different from a voltage pulse of the first bias voltage V1 during the second stress period of the first refresh frame. As shown in FIG. 5A, the voltage pulse of the first bias voltage V1 during the second stress period of the second refresh frame is wider than the voltage pulse of the first bias voltage V1 during the second stress period of the first refresh frame.

Referring to FIG. 5B, the first reset frame AR1 may be driven to a high level so that the first bias voltage V1 with the high level is applied as the stress voltage Vobs during the stress period Tobs, and may be switched back to the low level after the stress period Tobs terminates. When the first bias voltage V1 is driven as a third stress voltage Vobs in the first reset frame AR1, the high level may be maintained for, for example, at least 44 horizontal periods.

In the second reset frame AR2, the first bias voltage V1 may not be switched to a low level, but may be continuously maintained at a high level during the second reset frame AR2.

Figure 6:
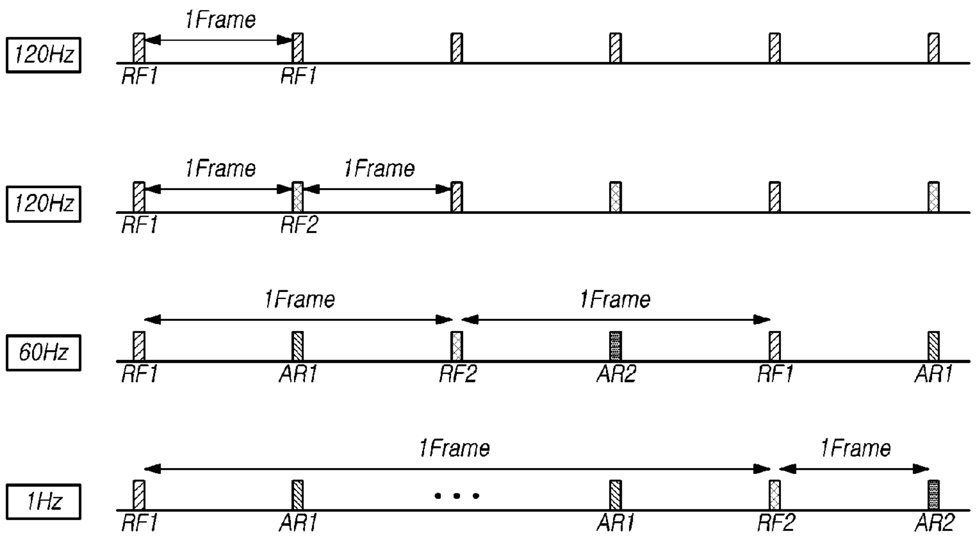
FIG. 6 illustrates the configuration in which one frame is configured of a refresh frame and a reset frame according to a refresh rate in the display device according to an embodiment of the present disclosure.

FIG. 6 illustrates the configuration in which one frame is configured of a refresh frame and a reset frame according to a refresh rate (e.g., refresh frequencies) in the display device according to an embodiment of the present disclosure. The refresh rate is selectable among a plurality of different refresh rates in one embodiment. For example, the plurality of different refresh rates may have a fastest refresh rate (e.g., 120 Hz), a slowest refresh rate (e.g., 1 Hz), and one or more intermediate refresh rates (e.g., 60 Hz) that is between the fastest and slowest refresh rates. A frequency at which the bias voltage V1 is supplied to the third node N3 during the different refresh frequencies is the same across the different refresh frequencies due to the timing of the refresh frames and reset frames.

Referring to FIG. 6, when the refresh rate is driven at 120 Hz (e.g., the fastest refresh rate), the display device may be driven with only the refresh frame, and when the refresh rate is driven at 60 Hz (e.g., an intermediate refresh rate), the refresh frame and the reset frame may be alternately operated. In particular, for example, if the refresh rate is driven at 1 Hz (e.g., the slowest refresh rate), within one frame, one refresh frame and a plurality of reset frames may be configured as one set and driven to be repeated.

In the case of driving only at the driving timing of the first refresh frame RF1 at a refresh rate of 120 Hz, there may be generated the stress due to a potential difference of about 99% for each frame between the adjacent second odd scan line SL2_O of the high potential and the power supply line VL of the low potential. Thus, driving the display device with only the first refresh frame RF1 is undesirable.

On the other hand, when the first refresh frame RF1 and the second refresh frame RF2 are alternately applied, stress may be reduced in half due to the potential difference between the adjacent second odd scan line SL2_O of the high potential and the power supply line VL of the low potential. At a refresh rate of 60 Hz, one first refresh frame RF1 and one first reset frame AR1 constitute one frame, and it may alternately operate with another frame including one second refresh frame RF2 and one second reset frame AR2.

Similarly, at a refresh rate of 1 Hz, one first refresh frame RF1 and 119 first reset frames AR1 may constitute one frame, and in the same way, it may alternately operate with another frame including the second refresh frame RF2 and the second reset frame AR2. The frequency at which the first bias voltage V1 is supplied to node N3 during the different refresh frequencies matches one of the refresh frequencies from the plurality of different refresh frequencies due to the application of the bias voltage V1 during at least one of the first fresh period RF1, the second refresh period RF2, the first reset period AR1, or the second reset period AR2. In one embodiment, the frequency at which the first bias voltage V1 is supplied to node N3 during the different refresh frequencies matches a fastest frequency from amongst the plurality of different refresh frequencies.

Accordingly, there may be reduced the dendrite phenomenon caused by the potential difference between the second odd scan line SL2_O and the power supply line (VL), so that a short circuit between the two signal lines can be prevented, thereby the display abnormality may be improved.

A display device according to an embodiment of the present specification may be described as follows.

In one embodiment, a display device comprises: a display panel including a display area, a non-display area, a scan line, a power supply line, and a pixel in the display area that is connected to the scan line and the power supply line; a gate driver configured to supply a scan signal to the pixel through the scan line; and a bias driver configured to supply a bias voltage to the pixel through the power supply line, wherein a driving period of the pixel includes a first frame and a second frame different from the first frame, wherein the first frame includes a first refresh period in which a first data voltage is written and a first reset period in which the first data voltage is maintained, wherein the second frame includes a second refresh period in which a second data voltage is written and a second reset period in which the second data voltage is maintained, and wherein a first voltage pulse of the bias voltage during the first refresh period and a second voltage pulse of the bias voltage during the second refresh period are different from each other.

In one embodiment, the first refresh period alternately includes two or more first level bias periods in which the bias voltage has a first voltage and two or more second level bias periods in which the bias voltage has a second voltage that is less than the first voltage, and the second refresh period includes one second level bias period in which the bias voltage has the second voltage and two first level bias periods in which the bias voltage has the first voltage.

In one embodiment, the first refresh period includes: a first period in which the scan signal has a first level that is greater than a second level of the scan signal; a second period in which the bias voltage has a first level voltage after the first period; and a third period in which the bias voltage has a second level voltage that is less than the first level of the bias voltage after the second period, wherein the second refresh period includes: a fourth period in which the scan signal has the first level of the scan signal; and a fifth period in which the bias voltage maintains the first voltage of the bias voltage after the fourth period.

In one embodiment, during the first reset period a level of the bias voltage is changed one or more times between a first level and a second level that is less than the first level, and during the second reset period the bias voltage is maintained at the first level.

In one embodiment, in a non-display area located outside a display area in which an image is displayed, the scan line and the power supply line are adjacent to each other In one embodiment, the gate driver comprises a first scan driver, a plurality of second scan drivers, and a third scan driver, wherein the first scan driver and the third scan driver are disposed in the non-display area at a first side of the display area, and the plurality of second scan drivers are disposed in the non-display area on the first side of the display area and a second side of the display area that is opposite the first side.

In one embodiment, the plurality of second scan drivers disposed in the non-display area on the first side and the second side of the display area are configured to simultaneously apply the scan signal to the scan line.

In one embodiment, the first scan driver and the third scan driver are disposed in the non-display area on the first side of the display area, and the bias driver are disposed in the non-display area on the second side of the display area.

In one embodiment, the display panel includes a plurality of scan lines and the plurality of second scan drivers comprise a scan driver configured to apply a scan signal to an odd number scan line from the plurality of scan lines during the first refresh frame, and another scan driver configured to apply a scan signal to an even numbered scan line from the plurality of scan lines during the first refresh frame.

In one embodiment, the display panel includes a plurality of data lines and the plurality of second scan drivers are aligned in a direction in which the plurality of data lines extend in the display panel.

In one embodiment, one of the plurality of scan lines and the power supply line are directly adjacent to each other in the display panel.

In one embodiment, a display device comprises: a display panel including a plurality of pixels configured to display an image at one of a plurality of different refresh frequencies, the plurality of different refresh frequencies including a first refresh frequency and a second refresh frequency that is different from the first refresh frequency; a data driver configured to apply data voltages to the plurality of pixels; and a gate driver configured to apply scan signals to the plurality of pixels, wherein at least one of the plurality of pixels includes: a driving element including a gate electrode of the driving element that is connected to a first node, a first electrode of the driving element that is connected to a second node to which a data voltage from the plurality of data voltages is applied, and a second electrode of the driving element that is connected to a third node; a light emitting element configured to emit light by being driven by a current from the driving element; and a first switch element configured to supply a bias voltage from a power line to the third node that is connected to the second electrode of the driving element while the light emitting element does not emit light, wherein a frequency at which the bias voltage is supplied to the third node during the first refresh frequency is a same as a frequency at which the bias voltage is supplied to the third node during the second refresh frequency.

In one embodiment, the frequency at which the bias voltage is supplied during the first refresh frequency and the frequency at which the bias voltage is supplied during the second refresh frequency matches the first frequency from the plurality of different refresh frequencies where the first frequency is greater than the second frequency.

In one embodiment, a frame period of the display device includes a first refresh frame and a second refresh frame that is after the first refresh frame responsive to the refresh frequency being the first frequency, the first refresh frame having a first timing at which the bias voltage is applied during the first refresh frame, and the second refresh frame having a second timing at which the bias voltage is applied during the refresh frame that is different from the first timing, wherein the first timing is a first period of time at which the bias voltage is applied to the third node during the first refresh frame, and the second timing is a second period of time at which the bias voltage is applied to the third node during the second refresh frame, the second period of time longer than the first period of time.

In one embodiment, responsive to the refresh frequency being the second frequency, a first frame period of the display device includes a first refresh frame during which the data voltage is written and having a first refresh timing at which the bias voltage is applied to the third node during the first refresh frame and one or more first reset frames that are after the first refresh frame during which the data voltage that was written is maintained and having a first reset timing at which the bias voltage is applied to the third node first reset frame, wherein a second frame period of the display device that is after the first frame period includes a second refresh frame during which another data voltage is written and having a second refresh timing at which the bias voltage is applied to the third node during the second refresh frame and one or more second reset frames that are after the second refresh frame during which the other data voltage that was written is maintained and having a second reset timing at which the bias voltage is applied to the third node first reset frame, wherein the first refresh timing is a first refresh period of time at which the bias voltage is applied to the third node during the first refresh frame, and the second refresh timing is a second refresh period of time at which the bias voltage is applied to the third node during the second refresh frame, the second refresh period of time longer than the first refresh period of time, and wherein the first reset timing is a first reset period of time at which the bias voltage is applied to the third node during the first reset frame, and the second refresh timing is a second reset period of time at which the bias voltage is applied to the third node during the second refresh frame, the second reset period of time longer than the first reset period of time.

In one embodiment, the at least one of the plurality of pixels further includes: a first switch element that diode-connects the first node and the third node; a second switch element configured to apply the data voltage to the second node; a third switch element configured to apply a high potential voltage from a fourth node to the second node; a fifth switch element configured to apply another bias voltage to an anode electrode of the light emitting device; and a storage capacitor having a first electrode connected to the first node and a second electrode connected to the fourth node.

In one embodiment, the other bias voltage is applied to the anode electrode of the light emitting device while the bias voltage is applied to the third node.

In one embodiment, a display panel comprises: a light emitting device; a driving transistor configured to drive the light emitting device; a bias transistor configured to control a connection between a drain electrode or a source electrode of the driving transistor and a power supply line; and a data supply transistor configured to control a connection between the source electrode or the drain electrode of the driving transistor and a data line according to a scan signal supplied from a scan line, wherein in a non-display area located outside a display area in which an image is displayed, the scan line and the power supply line are disposed adjacent to each other.

In one embodiment, the power supply line supplies a bias voltage to one of the drain electrode or the source electrode of the driving transistor.

In one embodiment, a driving period includes a first frame and a second frame different from the first frame, wherein the first frame includes a first refresh period in which a first data voltage is written and a first reset period in which the first data voltage is maintained, wherein the second frame includes a second refresh period in which a second data voltage is written and a second reset period in which the second data voltage is maintained, and wherein a first voltage pulse of the bias voltage during the first refresh period and a second voltage pulse of the bias voltage during the second refresh period are different from each other.

Features, structures, effects, etc. described in the above-described examples of the present disclosure are included in at least one embodiment of the present disclosure, and are not necessarily limited to only one embodiment. Furthermore, features, structures, effects, etc. illustrated in at least one example of the present disclosure may be combined or modified with respect to other examples by those of ordinary skill in the art to which this disclosure belongs. Accordingly, the contents related to such combinations and modification should be interpreted as being included in the scope of the present disclosure.

Although the embodiments of the present disclosure have been described in more detail with reference to the accompanying drawings, the present invention is not necessarily limited to these embodiments, and various modifications may be possible within the scope without departing from the technical spirit of the present invention. Accordingly, the embodiments disclosed in the present disclosure are not intended to limit the technical spirit of the present invention, but to exemplarily explain the present invention, and the scope of the technical spirit of the present invention is not limited by these embodiments. Therefore, there should be understood that the embodiments described above are illustrative in all respects and not restrictive. The protection scope of the present invention should be construed by the following claims, and all technical ideas within the scope equivalent thereto should be construed as being included in the scope of the present invention.

What is claimed is:

1. A display device comprising:

a display panel including a display area, a non-display area, a scan line, a power supply line, and a pixel in the display area that is connected to the scan line and the power supply line;

a gate driver configured to supply a scan signal to the pixel through the scan line; and a bias driver configured to supply a bias voltage to the pixel through the power supply line, wherein a driving period of the pixel includes a first frame and a second frame different from the first frame, wherein the first frame includes a first refresh period in which a first data voltage is written and a first reset period in which the first data voltage is maintained, wherein the second frame includes a second refresh period in which a second data voltage is written and a second reset period in which the second data voltage is maintained, and wherein a first voltage pulse of the bias voltage during the first refresh period and a second voltage pulse of the bias voltage during the second refresh period are different from each other.

2. The display device of claim 1, wherein the first refresh period alternately includes two or more first level bias periods in which the bias voltage has a first voltage and two or more second level bias periods in which the bias voltage has a second voltage that is less than the first voltage, and wherein the second refresh period includes one second level bias period in which the bias voltage has the second voltage and two first level bias periods in which the bias voltage has the first voltage.

3. The display device of claim 1, wherein the first refresh period includes:

a first period in which the scan signal has a first level that is greater than a second level of the scan signal;

a second period in which the bias voltage has a first level voltage after the first period; and a third period in which the bias voltage has a second level voltage that is less than the first level of the bias voltage after the second period, wherein the second refresh period includes:

a fourth period in which the scan signal has the first level of the scan signal; and a fifth period in which the bias voltage maintains the first voltage of the bias voltage after the fourth period.

4. The display device of claim 1, wherein during the first reset period a level of the bias voltage is changed one or more times between a first level and a second level that is less than the first level, and during the second reset period the bias voltage is maintained at the first level.

5. The display device of claim 1, wherein in a non-display area located outside a display area in which an image is displayed, the scan line and the power supply line are adjacent to each other.

6. The display device of claim 1, wherein the gate driver comprises a first scan driver, a plurality of second scan drivers, and a third scan driver, wherein the first scan driver and the third scan driver are disposed in the non-display area at a first side of the display area, and the plurality of second scan drivers are disposed in the non-display area on the first side of the display area and a second side of the display area that is opposite the first side.

7. The display device of claim 6, wherein the plurality of second scan drivers disposed in the non-display area on the first side and the second side of the display area are configured to simultaneously apply the scan signal to the scan line.

8. The display device of claim 6, wherein the first scan driver and the third scan driver are disposed in the non-display area on the first side of the display area, and the bias driver are disposed in the non-display area on the second side of the display area.

9. The display device of claim 7, wherein the display panel includes a plurality of scan lines and the plurality of second scan drivers comprise a scan driver configured to apply a scan signal to an odd number scan line from the plurality of scan lines during the first refresh frame, and another scan driver configured to apply a scan signal to an even numbered scan line from the plurality of scan lines during the first refresh frame.

10. The display device of claim 9, wherein the display panel includes a plurality of data lines and the plurality of second scan drivers are aligned in a direction in which the plurality of data lines extend in the display panel.

11. The display device of claim 9, wherein one of the plurality of scan lines and the power supply line are directly adjacent to each other in the display panel.

12. A display device comprising:

a display panel including a plurality of pixels configured to display an image at one of a plurality of different refresh frequencies, the plurality of different refresh frequencies including a first refresh frequency and a second refresh frequency that is different from the first refresh frequency;

a data driver configured to apply data voltages to the plurality of pixels; and a gate driver configured to apply scan signals to the plurality of pixels, wherein at least one of the plurality of pixels includes:

a driving element including a gate electrode of the driving element that is connected to a first node, a first electrode of the driving element that is connected to a second node to which a data voltage from the plurality of data voltages is applied, and a second electrode of the driving element that is connected to a third node;

a light emitting element configured to emit light by being driven by a current from the driving element; and a first switch element configured to supply a bias voltage from a power line to the third node that is connected to the second electrode of the driving element while the light emitting element does not emit light, wherein a frequency at which the bias voltage is supplied to the third node during the first refresh frequency is a same as a frequency at which the bias voltage is supplied to the third node during the second refresh frequency.

13. The display device of claim 12, wherein the frequency at which the bias voltage is supplied during the first refresh frequency and the frequency at which the bias voltage is supplied during the second refresh frequency matches the first frequency from the plurality of different refresh frequencies where the first frequency is greater than the second frequency.

14. The display device of claim 13, wherein a frame period of the display device includes a first refresh frame and a second refresh frame that is after the first refresh frame responsive to the refresh frequency being the first frequency, the first refresh frame having a first timing at which the bias voltage is applied during the first refresh frame, and the second refresh frame having a second timing at which the bias voltage is applied during the refresh frame that is different from the first timing, wherein the first timing is a first period of time at which the bias voltage is applied to the third node during the first refresh frame, and the second timing is a second period of time at which the bias voltage is applied to the third node during the second refresh frame, the second period of time longer than the first period of time.

15. The display device of claim 13, wherein responsive to the refresh frequency being the second frequency, a first frame period of the display device includes a first refresh frame during which the data voltage is written and having a first refresh timing at which the bias voltage is applied to the third node during the first refresh frame and one or more first reset frames that are after the first refresh frame during which the data voltage that was written is maintained and having a first reset timing at which the bias voltage is applied to the third node first reset frame, wherein a second frame period of the display device that is after the first frame period includes a second refresh frame during which another data voltage is written and having a second refresh timing at which the bias voltage is applied to the third node during the second refresh frame and one or more second reset frames that are after the second refresh frame during which the other data voltage that was written is maintained and having a second reset timing at which the bias voltage is applied to the third node first reset frame, wherein the first refresh timing is a first refresh period of time at which the bias voltage is applied to the third node during the first refresh frame, and the second refresh timing is a second refresh period of time at which the bias voltage is applied to the third node during the second refresh frame, the second refresh period of time longer than the first refresh period of time, and wherein the first reset timing is a first reset period of time at which the bias voltage is applied to the third node during the first reset frame, and the second refresh timing is a second reset period of time at which the bias voltage is applied to the third node during the second refresh frame, the second reset period of time longer than the first reset period of time.

16. The display device of claim 12, wherein the at least one of the plurality of pixels further includes:

a first switch element that diode-connects the first node and the third node;

a second switch element configured to apply the data voltage to the second node;

a third switch element configured to apply a high potential voltage from a fourth node to the second node;

a fifth switch element configured to apply another bias voltage to an anode electrode of the light emitting device; and a storage capacitor having a first electrode connected to the first node and a second electrode connected to the fourth node.

17. The display device of claim 16, wherein the other bias voltage is applied to the anode electrode of the light emitting device while the bias voltage is applied to the third node.

18. A display panel comprising:

a light emitting device;

a driving transistor configured to drive the light emitting device;

a bias transistor configured to control a connection between a drain electrode or a source electrode of the driving transistor and a power supply line; and a data supply transistor configured to control a connection between the source electrode or the drain electrode of the driving transistor and a data line according to a scan signal supplied from a scan line, wherein in a non-display area located outside a display area in which an image is displayed, the scan line and the power supply line are disposed adjacent to each other, and wherein a driving period includes a first frame and a second frame different from the first frame, wherein the first frame includes a first refresh period in which a first data voltage is written and a first reset period in which the first data voltage is maintained, wherein the second frame includes a second refresh period in which a second data voltage is written and a second reset period in which the second data voltage is maintained, and wherein a first voltage pulse of the bias voltage during the first refresh period and a second voltage pulse of the bias voltage during the second refresh period are different from each other.

19. The display panel of claim 18, wherein the power supply line supplies a bias voltage to one of the drain electrode or the source electrode of the driving transistor.

* * * * *